(12) United States Patent
Zheng et al.

(10) Patent No.: US 12,513,761 B2
(45) Date of Patent: Dec. 30, 2025

(54) HEADSET COMMUNICATION METHOD, SYSTEM AND APPARATUS, AND EQUIPMENT AND STORAGE MEDIUM

(71) Applicant: TELINK SEMICONDUCTOR (SHANGHAI) CO., LTD., Shanghai (CN)

(72) Inventors: Mingjian Zheng, Shanghai (CN); Haipeng Jin, Shanghai (CN)

(73) Assignee: TELINK SEMICONDUCTOR (SHANGHAI) CO., LTD., Shanghai (CN)

( * ) Notice: Subject to any disclaimer, the term of this patent is extended or adjusted under 35 U.S.C. 154(b) by 573 days.

(21) Appl. No.: 17/975,371

(22) Filed: Oct. 27, 2022

(65) Prior Publication Data

US 2023/0354450 A1 Nov. 2, 2023

(30) Foreign Application Priority Data

Apr. 28, 2022 (CN) .......................... 202210471334.1

(51) Int. Cl.
*H04W 76/15* (2018.01)
*H04R 1/40* (2006.01)
*H04W 72/0446* (2023.01)

(52) U.S. Cl.
CPC .............. *H04W 76/15* (2018.02); *H04R 1/40* (2013.01); *H04W 72/0446* (2013.01); *H04R 2420/07* (2013.01)

(58) Field of Classification Search
CPC ..... H04S 7/00; H04W 76/15; H04W 72/0446; H04W 72/04; H04R 1/40; G10L 19/16; G10H 1/00; G06F 15/16
See application file for complete search history.

(56) References Cited

U.S. PATENT DOCUMENTS

| 8,121,547 B2 | 2/2012 | Findlay et al. |
| 2019/0028580 A1* | 1/2019 | Hosoi .............. H04M 1/0264 |

(Continued)

FOREIGN PATENT DOCUMENTS

| EP | 2 521 376 A2 | 11/2012 |
| EP | 2 377 330 A1 | 9/2017 |

OTHER PUBLICATIONS

Extended European Search Report mailed May 31, 2023 in European Application No. 22201080.3, 6 pages.

*Primary Examiner* — Iqbal Zaidi
(74) *Attorney, Agent, or Firm* — Nixon & Vanderhye P.C.

(57) ABSTRACT

The present disclosure provides a method, a system and an apparatus for headset communication, a device and a storage medium. The method includes receiving, by a wireless headset in response to a call request from a mobile terminal, first audio data sent by the mobile terminal, within a first time slot through a first wireless communication channel pre-established between a wireless headset and the mobile terminal; receiving, by the wireless headset in response to an audio transmission request from a wireless device, second audio data sent by the wireless device, within a second time slot through a second wireless communication channel pre-established between the wireless headset and the wireless device; and mixing, by the wireless headset, the received first and second audio data to acquire mixed audio data for playback, where the first time slot and the second time slot belong to different unit groups of time slots.

18 Claims, 4 Drawing Sheets

(56) References Cited

U.S. PATENT DOCUMENTS

| | | | |
|---|---|---|---|
| 2023/0058270 A1* | 2/2023 | Liu .................... | H04N 21/2387 |
| 2024/0048931 A1* | 2/2024 | Southwell ............. | G10L 19/018 |

* cited by examiner

HEADSET COMMUNICATION METHOD, SYSTEM AND APPARATUS, AND EQUIPMENT AND STORAGE MEDIUM

CROSS-REFERENCE TO RELATED PATENT APPLICATION

The present disclosure claims the benefit of and priority to Chinese Patent Application No. 202210471334.1 filed on Apr. 28, 2022, the entire disclosure of which is incorporated by reference herein.

TECHNICAL FIELD

The present disclosure relates to the technical field of wireless headsets, and in particular relates to a method, a system and an apparatus for headset communication, a device and a storage medium.

BACKGROUND

With the development of wireless communication technologies and the widespread application of related Bluetooth products, Bluetooth wireless headsets have become a must-have to carry around. In order for more convenience in carrying and wearing, wireless headsets such as true wireless stereo (TWS) earbuds and wearable headsets are more and more widely used.

Taking the game scenario as an example, some background music may be played in certain large-scale online games. However, a traditional wireless headset typically cannot enable the player to hear the game background music during a call or chat. Thus, the player may fail to get immersed into the game and thereby cannot enjoy the game, which brings a lot of inconvenience to the player.

SUMMARY

Aiming at the aforesaid problem in the prior art, provided are a method, a system and an apparatus for headset communication, a device and a storage medium, by which the aforesaid problem can be solved.

The present disclosure provides following solutions.

In a first aspect, the present disclosure provides a method of headset communication, which includes:
  receiving, by a wireless headset in response to a call request from a mobile terminal, first audio data sent by the mobile terminal, within a first time slot through a first wireless communication channel pre-established between the wireless headset and the mobile terminal;
  receiving, by the wireless headset in response to an audio transmission request from a wireless device, second audio data sent by the wireless device, within a second time slot through a second wireless communication channel pre-established between the wireless headset and the wireless device, where the first time slot and the second time slot belong to different unit groups of time slots; and
  mixing, by the wireless headset, the received first and second audio data to acquire mixed audio data for playback.

According to a possible embodiment, the wireless headset is a true wireless stereo (TWS) headset including a first earbud and a second earbud, the method further includes:
  receiving, by the first earbud in response to a control request from the second earbud, first control data sent by the second earbud, within a third time slot through a third wireless communication channel pre-established between the first earbud and the second earbud, where the first control data is configured to control the first earbud to perform an operation corresponding to the first control data, and the second time slot and the third time slot belong to the same unit group of time slots.

According to a possible embodiment, the method further includes:
  performing, by the first earbud after receiving the first audio data, a signal analysis on the first audio data to determine first sub-audio data corresponding to the first earbud; and
  performing, by the first earbud after receiving the second audio data, a signal analysis on the second audio data to determine second sub-audio data corresponding to the first earbud.

According to a possible embodiment, mixing, by the wireless headset, the received first and second audio data to acquire the mixed audio data for playback includes:
  mixing, by the first earbud, the first and second sub-audio data corresponding to the first earbud to acquire a mixed audio data to be played by the first earbud.

According to a possible embodiment, the method further includes:
  performing, by the second earbud after receiving the first audio data, a signal analysis on the first audio data, to determine first sub-audio data corresponding to the second earbud; and
  performing, by the second earbud after receiving the second audio data, a signal analysis on the second audio data, to determine second sub-audio data corresponding to the second earbud.

According to a possible embodiment, the method further includes:
  receiving, by the TWS headset in response to a control request from the mobile terminal, second control data sent by the mobile terminal, within a fourth time slot through the first wireless communication channel;
  and/or
  receiving, by the TWS headset in response to a control request from the wireless device, third control data sent by the wireless device, within the second time slot through the second wireless communication channel.

According to a possible embodiment, the first wireless communication channel and the second wireless communication channel remain connected simultaneously and the first audio data, the second audio data, the second control data and the third control data are received alternately in respective time slots.

According to a possible embodiment, the first earbud is a primary earbud, and the method further includes:
  generating, by the first earbud, fourth control data for controlling data transmission of the mobile terminal based on status information on communications between the first earbud and the mobile terminal and between the first earbud and the second earbud; and
  sending, by the first earbud, the fourth control data to the mobile terminal within a fifth time slot through the first wireless communication channel, where the fourth time slot and the fifth time slot belong to the same unit group of time slots and are adjacent to each other.

According to a possible embodiment, the first earbud is a primary earbud, and the method further includes:
  generating, by the first earbud, fifth control data for controlling data transmission of the wireless device based on status information on communication between the first earbud and the wireless device; and sending, by the first earbud, the fifth control data to the wireless device within a sixth time slot through the second wireless communication channel; and/or generating, by the first earbud, sixth control data for controlling data transmission of the second earbud based on status information on communications between the first earbud and the wireless device and between the first earbud and the second earbud; and sending, by the first earbud, the sixth control data to the second earbud within a sixth time slot through the third wireless communication channel, where the second time slot and the sixth time slot belong to the same unit group of time slots.

According to a possible embodiment, the method further includes:

acquiring, by the first earbud, currently collected user audio data; and sending, by the first earbud, the user audio data to the mobile terminal within a seventh time slot through the first wireless communication channel, where the first time slot and the seventh time slot belong to the same unit group of time slots and are adjacent to each other.

According to a possible embodiment, sending, by the first earbud, the fifth control data to the wireless device within the sixth time slot includes:

sending, by the first earbud through the second wireless communication channel, the user audio data and the fifth control data simultaneously to the wireless device within the sixth time slot.

According to a possible embodiment, the wireless headset is a wearable stereo wireless headset, and the method further includes:

generating seventh control data for controlling data transmission of the wireless device based on status information on communication between the stereo wireless headset and the wireless device; and sending the seventh control data to the wireless device through the second wireless communication channel.

According to a possible embodiment, a guard time slot is provided between a first unit group of time slots to which the first time slot belongs to and a second unit group of time slots to which the second time slot belongs to.

According to a possible embodiment, at least one first unit group of time slots and at least one second unit group of time slots are provided such that the at least one first unit group of time slots is twice as long as a sum of the guard time slot and the at least one second unit group of time slots.

According to a possible embodiment, a unit group of time slots corresponding to the first wireless communication channel meets time slot requirement for Bluetooth communication; and the at least one first unit group of time slots, the guard time slot and the at least one second unit group of time slots are 7.5 milliseconds long in total.

According to a possible embodiment, the wireless device is connected to an audio source device other than the mobile phone via a universal serial bus (USB) component.

In a second aspect, embodiments of the present disclosure further provide a system for headset communication, which includes a mobile terminal, a wireless device, and a wireless headset in wireless communication with the mobile terminal and the wireless device;

where the mobile terminal is configured to initiate a call request, and send first audio data to the wireless headset through a first wireless communication channel pre-established between the wireless headset and the mobile terminal;

the wireless device is configured to initiate an audio transmission request, and send second audio data to the wireless headset through a second wireless communication channel pre-established between the wireless headset and the wireless device; and the wireless headset is configured to receive the first audio data and the second audio data separately, and mix the received first and second audio data to acquire mixed audio data for playback.

In a third aspect, embodiments of the present disclosure further provide an apparatus for headset communication, which includes:

a transceiving module configured to: receive, in response to a call request from a mobile terminal, first audio data sent by the mobile terminal, within a first time slot through a first wireless communication channel pre-established between a wireless headset and the mobile terminal; and receive, in response to an audio transmission request from a wireless device, second audio data sent by the wireless device, within a second time slot through a second wireless communication channel pre-established between the wireless headset and the wireless device, where the first time slot and the second time slot belong to different unit groups of time slots; and a mixing module configured to mix the received first and second audio data to acquire mixed audio data for playback.

In a fourth aspect, embodiments of the present disclosure further provide an electronic device, which includes a processor, a memory and a bus, where the memory has machine-readable instructions executable by the processor stored therein; the processor communicates with the memory via the bus when the electronic device is in operation; and the machine-readable instructions, when executed by the processor, cause the headset communication method according to the first aspect or any one of the embodiments to be implemented.

In a fifth aspect, embodiments of the present disclosure further provide a computer-readable storage medium having programs stored thereon, where the programs, when executed by a multicore processor, cause the multicore processor to implement the method of headset communication according to the first aspect or any one of the embodiments.

In the method of headset communication according to the present disclosure, the first audio data sent by the mobile terminal can be received within a first time slot in response to a call request from the mobile terminal, and the second audio data sent by the wireless device can be received within a second time slot in response to an audio transmission request from the wireless device. In addition, the received first and second audio data can then be mixed to obtain the mixed audio data for playback, where the mixed audio data is a mixture of the first audio data generated by the mobile terminal during the call phase and the second audio data generated by the wireless device during the transmission phase, thus enabling the user to experience another audio during the call. For example, the user can feel the rhythm of the game background audio while making the phone call, which enhances the immersive experience during the headset communication. Furthermore, the first audio data and second audio data are received from different wireless communication channels and in different time slots, which can not only ensure no interference to the signals, but also can minimize the problem of time delay in wireless communication process, thereby being more practical.

Other advantages of the present disclosure will be explained in more detail in conjunction with the following description and accompanying drawings.

It should be noted that the aforesaid description is only an overview of the technical solutions of the present disclosure for facilitating better understanding of technical means of the present disclosure so as to enable implementation of the present disclosure in accordance with the content described in the specification. Detailed description of the present disclosure will be given below to make the above and other objects, features, and advantages of the present disclosure more apparent and comprehensible.

BRIEF DESCRIPTION OF THE DRAWINGS

By reading following details of the exemplary embodiments below, those of ordinary skills in the art may understand the advantages and benefits described herein and other advantages and benefits. The accompanying drawings are for the purpose of illustrating exemplary embodiments only and are not intended to be a limitation of the present disclosure. Further, the same reference sign is adopted to indicate the same or similar component throughout the accompanying drawings. In the accompanying drawings.

DETAILED DESCRIPTION

Figure 1:
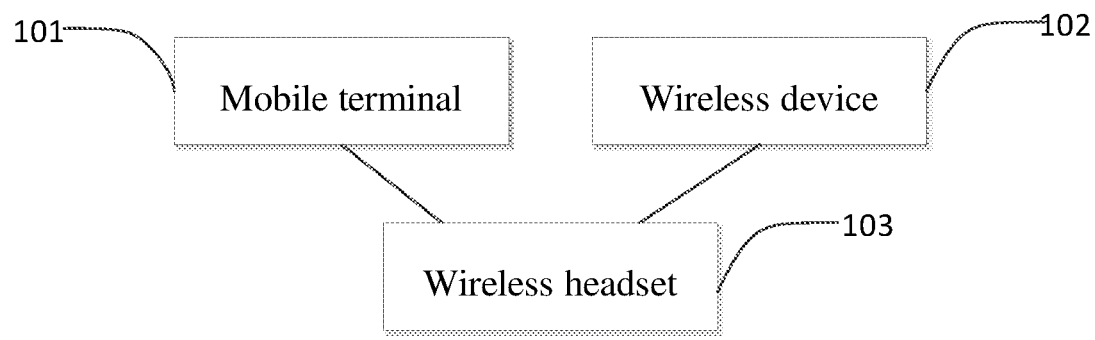
FIG. 1 is a schematic diagram of a system for headset communication according to an embodiment of the present disclosure.

Exemplary embodiments of the present disclosure will be described below in more detail with reference to the accompanying drawings. Although the accompanying drawings illustrate exemplary embodiments of the present disclosure, it should be understood that the present disclosure can be implemented in various forms and should not be construed as limited to embodiments described herein. Rather, these embodiments are provided so that the present disclosure will be understood thoroughly, and will fully convey the scope of the present disclosure to those skilled in the art.

In description of embodiments of the present disclosure, it should be understood that terms such as "include" or "have" are intended to indicate the existence of characteristics, digits, steps, actions, components, parts disclosed by the specification or any combination thereof, without excluding the existence of one or more other characteristics, digits, steps, actions, components, parts or any combination thereof.

Unless otherwise specified, "/" refers to "or"; for example, A/B may indicate A or B. In this specification, the term "and/or" merely describes the association relationship between the associated objects and indicates that there may be three relationships. For example, A and/or B may indicate three cases where only A exists, both A and B exist, and only B exists.

In addition, the terms such as "first" and "second" are merely for a descriptive purpose, and cannot be understood as indicating or implying a relative importance, or implicitly indicating the number of the indicated technical features. Hence, the features defined by "first" and "second" can explicitly or implicitly include one or more features. In the description of embodiments of the present disclosure, "a plurality of" means two or more in number, unless otherwise specified.

In order to illustrate the embodiments of the present disclosure clearly, some terms that may appear in subsequent embodiments will be introduced first.

Mobile terminal may refer to a computer device that can be used on the move, which in a broad sense includes cell phones, laptops, and the like, and may generally support standard Bluetooth audio transmission.

Wireless device may refer to a personal computer or a game platform, and may for example include a desktop computer, a laptop, various game devices, and the like.

Wireless headset may refer to a headset that transmits audio data via wireless signals and may have a Bluetooth function, such as a true wireless stereo (TWS) headset, a wearable stereo wireless headset, and the like.

Time slot may refer to a certain unit of time as defined in the general digital communication principle.

In the related art, taking the game scenario as an example, some background music may be played in certain large-scale online games. However, the traditional network wireless headset typically can support only one of a voice call/chat function and the background music playback at a time, and cannot support both of them at the same time. As a result, the player may fail to get immersed into the game during a voice call or chat, which brings a lot of inconvenience to the player.

As mentioned above, the traditional solution cannot enable the user to enjoy the game background music during the voice call or chat, and thus cannot meet the dual needs for both voice call and game immersion at the same time, which brings inconvenience to various application scenarios including the game scenario.

In order to address, at least in part, one or more of the aforesaid problem and other potential problems, embodiments of the present disclosure provide at least one headset communication solution. In this solution, the wireless headset on the one hand can establish wireless communication with the mobile terminal and receive the first audio data, and on the other hand can establish wireless communication with the wireless device and receive the second audio data, such that the dual auditory sensation for the audio from both the call and the wireless device can be met by the mixed audio data acquired by mixing the first and second audio data, thereby facilitating the application in various application scenarios.

The present disclosure will be described in detail below with reference to the accompanying drawings and embodiments.

To facilitate understanding of this embodiment, a system for headset communication according to embodiments of the present disclosure will be introduced first. As shown in FIG. 1, the system for headset communication according to embodiments of the present disclosure mainly includes a mobile terminal 101, a wireless device 102 and a wireless headset 103. The wireless headset 103 is in wireless communication with both the mobile terminal 101 and the wireless device 102.

The mobile terminal 101 is configured to initiate a call request, and send first audio data to the wireless headset 103 through a first wireless communication channel pre-established between the wireless headset 103 and the mobile terminal 101.

The wireless device 102 is configured to initiate an audio transmission request, and send second audio data to the wireless headset 103 through a second wireless communication channel pre-established between the wireless headset 103 and the wireless device 102.

The wireless headset 103 is configured to receive the first audio data and the second audio data separately, and mix the received first and second audio data to acquire mixed audio data for playback.

In the system for headset communication according to embodiments of the present disclosure, a call request is initiated by the mobile terminal 101 to send first audio data to the wireless headset 103 through a first wireless communication channel pre-established between the mobile terminal 101 and the wireless headset 103, and a transmission request is also initiated by the wireless device 102 to send second audio data to the wireless headset 103 through a second wireless communication channel pre-established between the wireless device 102 and the wireless headset 103, such that the wireless headset 103 can mix the received first and second audio data and thereby acquire the mixed audio data for playback. Thus it can be seen that, the auditory experience of dual audio data is provided for the user on the wireless headset 103 under the cooperation among the mobile terminal 101, the wireless device 102 and the wireless headset 103. Thus, compared with the wireless headset 103 in the related art that supports only one of the voice call function and the background music playback in games or other scenarios at a time, the wireless headset 103 of the present disclosure is more practical, and can be well applied in various scenarios including the game field.

The wireless headset 103 here may be various Bluetooth headsets including TWS headsets and wearable wireless headsets, such that wireless communication between the wireless headset 103 and the mobile terminal 101 can be carried out wirelessly via the respective Bluetooth functional modules as included. The communication between the wireless headset 103 and the mobile terminal 101 may be specifically implemented based on the relevant Bluetooth communication protocol. Under the specific Bluetooth communication protocol as implemented, a relevant first wireless communication channel may be pre-constructed to respond to the call request from the mobile terminal 101 and further to the audio data transmission request from the wireless headset 103, which allows the user to make a call with the remote or close mobile terminal 101 by the wireless headset 103.

Considering that the wireless device 102 shall be connected to personal computers, gaming devices, and other large devices in practical scenario applications, the wireless device 102 may therefore be connected to the large devices by relevant universal serial bus (USB) components. The process of establishing communication between the wireless headset 103 and the wireless device 102 is also dependent on the relevant communication protocol. Under the guidance of the communication protocol, the second wireless communication channel as pre-established may be adopted to respond to the transmission request from the wireless device 102, and further respond to the transmission request from the wireless headset 103, which allows the user to achieve signal transmission with the wireless device 102 by the wireless headset 103. Taking the game scenario as an example, the background audio data of the game may be transmitted herein.

It should be noted that the wireless device 102 may be connected to a personal computer, a laptop, or other mobile devices that support USB communication, which is not specifically limited here.

In the case that the wireless headset 103 receives the first audio data and the second audio data, in order to further enhance the user experience, the first and second audio data may be mixed to meet the dual needs for both audio and voice communication, which facilitates the application to various application scenarios. Here, still taking the game scenario as an example, the user can simultaneously experience the background sound of the game and make a voice call with the teammates to discuss the game strategy in real time, which results in a good gaming experience in certain large-scale online games.

The components included in different wireless headsets 103 are not the same, which may cause certain differences in the specific headset communication process. In order to facilitate further understanding of the system for headset communication according to the embodiments of the present disclosure, the TWS headset and the wearable wireless headset will be taken as examples of the wireless headset for illustration.

Figure 2A:
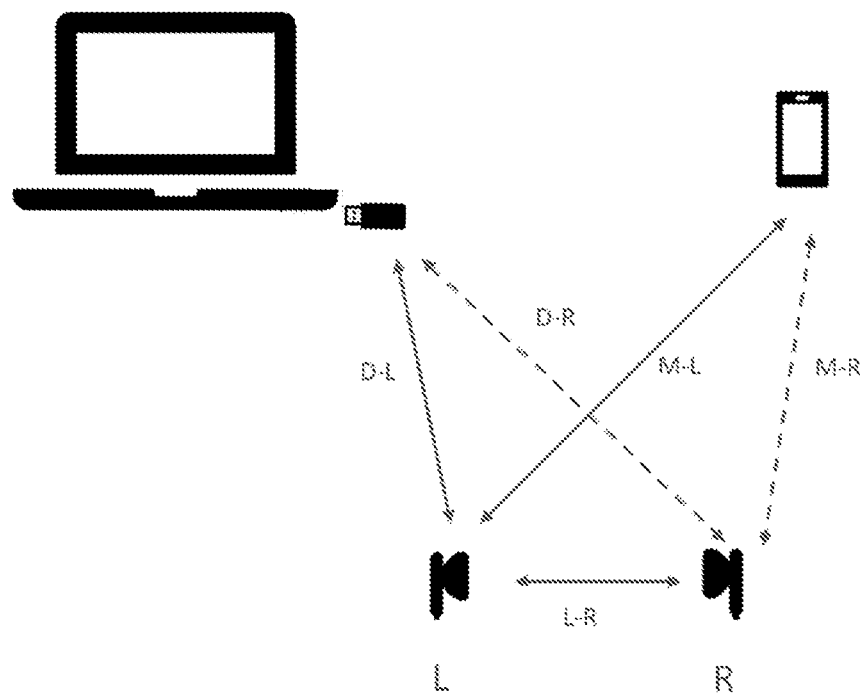
FIG. 2(a) is a schematic diagram of a communication system for a TWS headset according to an embodiment of the present disclosure.

FIG. 2(a) is a schematic diagram of a headset communication system consisting of a TWS headset, a cell phone (corresponding to a mobile terminal), and a corresponding wireless device (connected to a personal computer via USB) including a USB interface. The TWS headset includes a left earbud (corresponding to L) and a right earbud (corresponding to R), and the two earbuds (i.e., left and right earbuds) are in communication via a wireless channel. During the headset communication, the earbud L may perform wireless communication with a USB wireless device, a cell phone and the earbud R (as shown by the solid line); and the earbud R may perform wireless communication with the USB wireless device, the earbud L, and the cell phone (as shown by the dashed line). Based on this, the earbud L may mix the received first and second audio data, and output the mixed audio to the left ear of the user after rendering; similarly, the earbud R may mix the received first and second audio data, and output the mixed audio to the right ear of the user after rendering. The communication between the cell phone and the earbuds L and R may be implemented in the Bluetooth transmission manner.

Figure 2B:
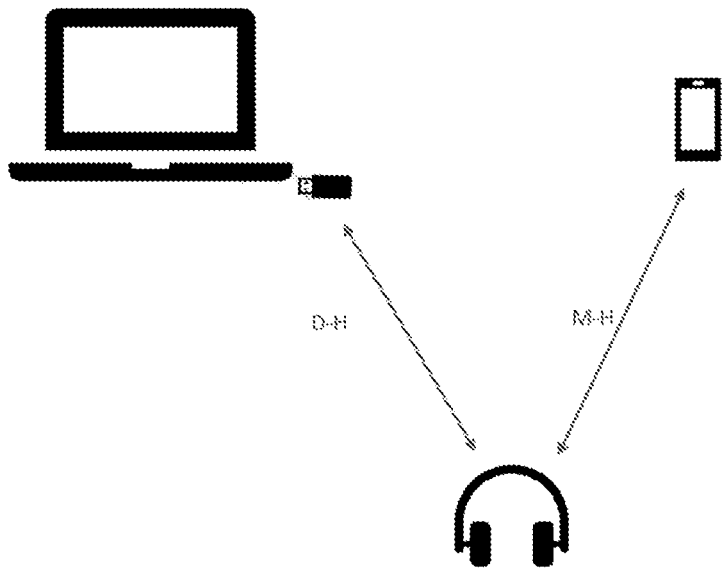
FIG. 2(b) is a schematic diagram of a communication system for a wearable wireless headset according to an embodiment of the present disclosure.

FIG. 2(b) is a schematic diagram of a headset communication system consisting of a wearable wireless headset, a cell phone, and a wireless device (connected to a personal computer via a USB port) including a USB interface. During the headset communication, the wearable wireless headset may mix the first audio data received through the wireless communication channel M-H and the second audio data received through the wireless communication channel D-H for playback.

Since the wireless headset plays a key role in the system for headset communication according to embodiments of the present disclosure, a method of headset communication taking the wireless headset as the execution subject will be mainly described below. The wireless headset generally refers to the headset having a Bluetooth function, which may for example include a TWS headset, a wearable wireless headset, and the like. In addition, some of the wireless communication is based on Bluetooth, whereas the other part of the wireless communication is based on a non-Bluetooth manner. In some possible embodiments, the method of headset communication described above may be implemented by the processor that calls computer-readable instructions stored in the memory.

It should be noted that instead of the wireless headset, any other electronic device with certain computing and audio playback capabilities is also available in the actual implementation of the method of headset communication described above. Due to the wide application, wireless headsets will be taken as examples below for illustration.

Figure 3:
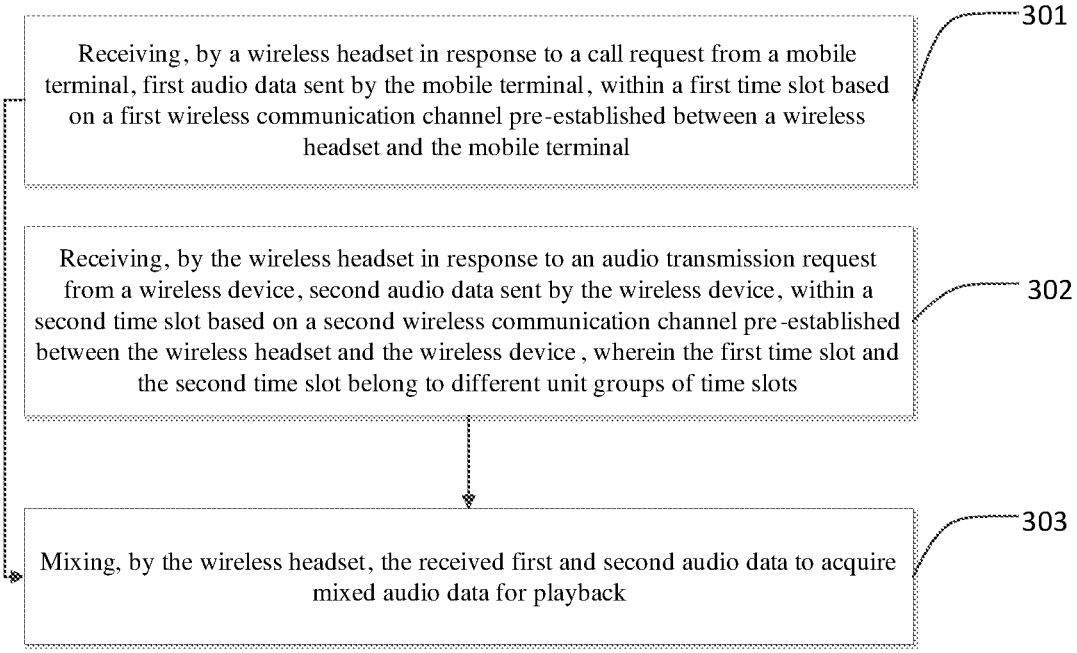
FIG. 3 is a flowchart of a method of headset communication according to an embodiment of the present disclosure.

FIG. 3 shows a flowchart of a method of headset communication according to an embodiment of the present disclosure, including steps S301 to S303.

S301: a wireless headset receives, in response to a call request from a mobile terminal, first audio data sent by the mobile terminal, within a first time slot through a first wireless communication channel pre-established between the wireless headset and the mobile terminal.

S302: the wireless headset receives, in response to an audio transmission request from a wireless device, second audio data sent by the wireless device, within a second time slot through a second wireless communication channel pre-established between the wireless headset and the wireless device, where the first time slot and the second time slot belong to different unit (or repeated) groups of time slots.

S303: the wireless headset mixes the received first and second audio data to acquire mixed audio data for playback.

In order to facilitate further understanding of the method of headset communication according to embodiments of the present disclosure, the application scenario of the method will be briefly illustrated first. The method of headset communication according to embodiments of the present disclosure may be mainly applied in the field of games, the field of map navigation or other various application scenarios that require simultaneous voice calls and audio listening, which is not specifically limited here. Considering the wide application in the field of games, the application scenario in the field of games will be taken as a primary example below for illustration.

The call request may be initiated when the mobile terminal dials. Under this case, the mobile terminal may send the first audio data through the first wireless communication channel pre-established between the wireless headset and the mobile terminal, and the wireless headset may receive the relevant first audio data within a determined first time slot. The audio transmission request may be initiated when an audio is played at the wireless device side. Under this case, the wireless device may send the second audio data through the second wireless communication channel pre-established between the wireless headset and the wireless device, and the wireless headset may receive the relevant second audio data within a determined second time slot.

In embodiments of the present disclosure, the relevant first wireless communication channel may be established based on the Bluetooth function module contained in each of the mobile terminal and the wireless headset, and the relevant second wireless communication channel may be established with the help of the USB component. The relevant description may be referred to the contents about the system for headset communication, which will not be repeated here.

It would be appreciated that, the first audio data transmitted during the call and the second audio data transmitted during playback of the audio are received in different time slots. Thus, there is no signal interference, which ensures the quality of the signal transmission and meanwhile allows a certain amount of time for the analysis of the wireless headset, especially for the sorting of the left and right earbuds and the like as included in the operations of the TWS headset, thereby facilitating the subsequent signal mixing.

It should be noted that the first and the second time slots not only are separate time slots, but also belong to different unit groups of time slots, which is mainly to ensure the continuity of upstream and downstream data transmission. In the first unit group of time slots to which the first time slot belongs, the user audio data as collected may be transmitted to the mobile terminal in addition to receiving the first audio data sent by the mobile terminal. In order to ensure continuity of the relevant call process, the relevant time slot for transmitting the user audio data may be provided in the same unit group of time slots with the first time slot for receiving the first audio data, and may for example be adjacent to the first time slot.

In practical applications, a guard time slot may be provided between the first unit group of time slots to which the first time slot belongs and the second unit group of time slots to which the second time slot belongs, in order to protect the respective transmission on the first wireless communication channel and the second wireless communication channel from each other. The respective data transmission from the mobile device and from the USB component corresponding to the wireless device may be not fully synchronized in timing. Thus, the provision of the guard time slot may avoid the interference problem caused by the timing synchronization failure in data transmission.

To facilitate an effective data transmission, at least one first unit group of time slots and at least one second unit group of time slots may be configured in embodiments of the present disclosure. The at least one first unit group of time slots may be used to mainly implement the call communication, with the first time slot or first unit group of time slots set to be 0.625 milliseconds long as the Bluetooth time slot. The at least one second unit group of time slots may be used to mainly implement the data transmission, with the second time slot or second unit group of time slots having a fixed specific or adaptively variable length. For example, the time slot length may be set to be longer if the transmission amount of data is relatively great, and may be set to be shorter if the transmission amount of data is relatively small.

In practical applications, in order to better balance the dual communication between the wireless headset and the mobile terminal and wireless device, the at least one first unit group of time slots may be configured to be twice as long as a sum of the guard time slot and the at least one second unit group of time slots, or may be configured as other multiples of the sum, which is not specifically limited here.

In practical applications, a first unit group of time slots, second unit group of time slots and a corresponding guard time slot may be provided to be 7.5 milliseconds long in total.

Upon receiving the first audio data and the second audio data, the two audio data (i.e., the first and second audio data) may be mixed to achieve the purpose of listening the audio without affecting the voice call function. In practical applications, the audio volume and the call volume may be adaptively adjusted in conjunction with the specific application scenarios to render a better listening effect.

For different wireless headsets, the corresponding methods of headset communication as implemented may be slightly different. Thus, the headset communication for the TWS headset and the wearable stereo wireless headset may be detailed below with two implementations, respectively.

In a first implementation, the method of headset communication may be implemented separately by each earbud of the TWS headset, such as the left earbud of the TWS headset or the right earbud of the TWS headset. The two earbuds of the TWS headsets may operate simultaneously but perform different headset functions. For example, as the primary earbud, the left earbud further needs to transmit the user audio data collected per se in addition to performing the basic data communication and transmission.

In embodiments of the present disclosure, the two earbuds may be controlled by each other, and the earbud control may be achieved by following steps.

Step 1: In response to a control request from a second earbud of the TWS headset, the first control data sent by the second earbud is received within a third time slot through a third wireless communication channel pre-established between the second earbud and the first earbud. The third time slot is a time slot other than the first and second time slots, and the third time slot and the second time slot belong to the same unit group of time slots.

Step 2: The first earbud is controlled to perform the corresponding operation according to the first control data.

Due to the third wireless communication channel as pre-established between the second earbud and the first earbud, in the case that the second earbud initiates a control request, the first earbud may receive the first control data within the third time slot, in response to which the first earbud may perform the corresponding operation. The operation herein may include the control operation of the two earbuds during the data transmission, and may for example include the operation of turning up the receiving volume of the second earbud or adjusting the receiving frequency at which the data is received.

It should be noted that the guard time slot may be provided for the communication between two earbuds and other communication processes in practical applications.

The third wireless communication channel here may be a channel implemented based on the Bluetooth, and may in practical applications be constructed based on the Bluetooth communication protocol between the Bluetooth function modules contained in each of the two earbuds (first earbud and second earbud). The third time slot is a time slot other than the first and second time slots, which can reduce the transmission time delay as much as possible while ensuring the high quality data transmission.

It should be noted that the first earbud herein may be the left earbud of the TWS headset, and the second earbud namely corresponds to the right earbud of the TWS headset. In addition, the first earbud herein may the right earbud of the TWS headset, and the second earbud namely corresponds to the left earbud of the TWS headset, which is not specifically limited here.

No matter the first earbud is the left earbud or the right earbud, the first earbud and the second earbud operate independently. Upon receiving the first audio data, the first earbud and the second earbud may perform signal analysis to determine respective first sub-audio data corresponding to the first earbud and the second earbud. Similarly, upon receiving the second audio data, the first earbud and the second earbud may perform signal analysis to determine respective second sub-audio data corresponding to the first earbud and the second earbud.

In embodiments of the present disclosure, the first earbud may mix the first and second sub-audio data corresponding to the first earbud to obtain a mixed audio data to be played by the first earbud. Similarly, the second earbud may also mix the first and second sub-audio data corresponding to the second earbud to obtain the mixed audio data to be played by the second earbud, such that both earbuds of the TWS headset can play the audio independently.

No matter the first earbud is the left earbud or the right earbud, the first earbud may be controlled by the mobile terminal and the wireless device in practical applications to facilitate the wireless communication with the mobile terminal and/or the wireless device.

Specifically, in response to the control request from the mobile terminal, the second control data sent by the mobile terminal is received within a fourth time slot through the first wireless communication channel. The fourth time slot is another time slot. It could be appreciated that, the mobile terminal may transmit the second control data for controlling the first earbud to perform the corresponding operation through the pre-established first wireless communication channel, and the corresponding operation as performed by the first earbud under the control of the second control data may for example be adjusting the headset volume and the like.

The audio data and control data sent by the mobile terminal may be received by providing two separate time slots. Unlike the mobile terminal, the control data and the second audio data may be sent by the wireless device to the wireless headset in the same time slot, and the wireless headset may receive the data in the same time slot.

Furthermore, in response to the control request from the wireless device, the third control data sent by the wireless device may be received within the second time slot through the second wireless communication channel. It could be appreciated that, the wireless device may transmit the third control data for controlling the first earbud to perform the corresponding operation through the pre-established second wireless communication channel, and the third control data may be configured to control the first earbud to perform the corresponding operation.

To ensure the dual communication and meanwhile minimize the communication latency, the first wireless communication channel and the second wireless communication channel herein may remain connected simultaneously and the first audio data, the second audio data, the second control data and the third control data may be received alternately in respective time slots.

In practical applications, the left earbud may generally serve as a primary earbud of the TWS headset. In addition to the aforesaid relevant communication process, the primary earbud may further transmit the fourth control data for controlling data transmission of the mobile terminal. The fourth control data for controlling data transmission of the mobile terminal may be generated based on status information on communications between the primary earbud and the mobile terminal and between the first earbud and the second earbud. Then, the fourth control data is sent to the mobile terminal within a fifth time slot through the first wireless communication channel. The fourth time slot and the fifth time slot belong to the same unit group of time slots and are adjacent to each other.

The fourth control data herein may be any relevant data that can control data transmission of the mobile terminal.

For example, in a case where the communication quality between the wireless headset and the mobile terminal at the communication frequency recorded in the communication status information is poor, the fourth control data may correspondingly have the data for adjusting the communication frequency, such that the data communication between the two devices can be ensured.

Similarly, the primary earbud may also transmit the fifth control data for controlling the data transmission between the wireless device and the second earbud. In embodiments of the present disclosure, the fifth control data for controlling the wireless device may be sent to the wireless device within a sixth time slot through the second wireless communication channel; and the sixth control data for controlling the second earbud may be sent to the second earbud within the sixth time slot through the third wireless communication channel. The sixth time slot and the second time slot belong to the same unit group of time slots.

It could be appreciated that, the fifth and sixth control data for controlling the wireless device and the second earbud respectively may be transmitted in the same time slot. In the specific application, the control data related to the second earbud and the control data related to the wireless device may be firstly extracted from the overall control data as generated, and then the data may be transmitted via the corresponding wireless communication channel to achieve the corresponding control, which will further reduce the communication time delay.

Details about the fifth control data and the sixth control data may be referred to the aforesaid description, and will not be repeated here.

The primary earbud here may also support the transmission of the user audio data as collected per se, which can be achieved by following steps.

Step 1: currently collected user audio data is acquired; and

Step 2: the user audio data is sent to the mobile terminal within a seventh time slot through the first wireless communication channel. The seventh time slot and the first time slot may be two adjacent time slots belonging to the same unit group of time slots.

The user audio data herein may be captured in real time, and then sent to the mobile terminal within the seventh time slot through the first wireless communication channel as pre-established. The seventh time slot and the first time slot may be two adjacent time slots belonging to the same unit group of time slots. Thus, on the premise of minimizing the communication time delay, the continuity during the call can also be ensured, which enhances the listening experience after the subsequent signal mixing.

In practical applications, when the fifth control data is sent to the wireless device within the sixth time slot, the currently collected user audio data may also be sent to the wireless device to further reduce the communication time delay under the premise of ensuring the effective signal transmission.

Figure 4:
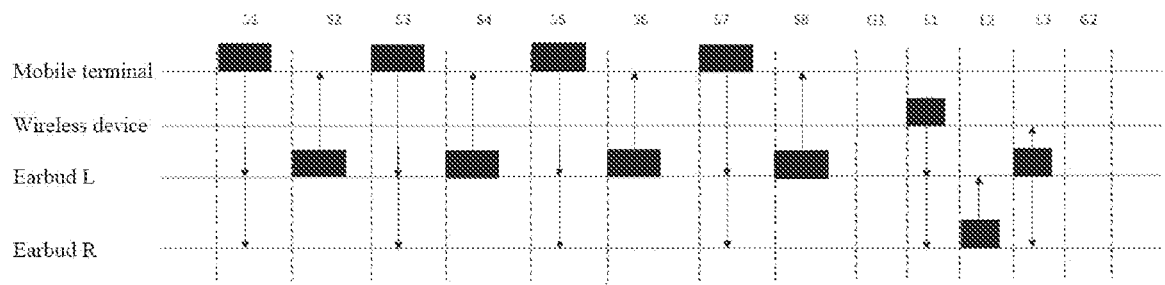
FIG. 4 is a time sequence diagram of communication in a communication method for a TWS headset according to an embodiment of the present disclosure.

To get a further understanding, the headset communication process for the TWS headset will be illustrated in conjunction with the time sequence diagram shown in FIG. 4.

In the time slot as shown in FIG. 4, one timing cycle may include 13 time slots, which are S1 to S8, L1 to L3, and G1 to G2, respectively. For S1 to S8, each may have an equal length, which is 0.625 ms long as the Bluetooth time slot. Each Bluetooth time slot is configured to realize the wireless communication between the wireless headset and the mobile terminal. L1 and L3 are configured to realize the wireless communication between the wireless headset and the wireless device, and L2 is configured to realize the wireless communication between the two earbuds. For G1 and G2, they correspond to the guard time slots for protecting the two wireless communication between the wireless headset and the mobile terminal and between the wireless headset and the wireless device from each other, in the situation where the mobile terminal and the wireless device cannot be fully synchronized in timing.

In the specific application, the length of G1+G2+L1+L2+L3 may be set to be equal to half of the sum of S1 to S8, such that all the 13 time slots contained in one timing cycle takes 7.5 ms in total, which achieves respective communication of the wireless headset with the audio device and the mobile terminal synchronized in timing with a low time delay. In addition, the time relationship of S1 to S8 may set to meet the Bluetooth communication requirement.

Each of slot pairs S1/S2, S3/S4, S5/S6, and S7/S8 herein may serve as a first unit group of time slots. In the unit group of time slots corresponding to S1/S2, the mobile terminal may send stereo audio to both earbud L and earbud R in one data packet. Then, the earbuds L and R may pick their respective data, and the earbud L may send the audio (e.g., user voice captured by the microphone) back to the mobile terminal. Similarly, the operations for the unit groups of time slots S3/S4 and S5/S6 are similar to that of the unit group of time slots S1/S2, and will not be repeated here. In addition, in the unit group of time slots S7/S8, the mobile terminal sends control data to the earbud L and the earbud R, respectively, and the earbud L sends the control data to the mobile terminal.

Furthermore, slot groups L1/L2/L3 may serve as a second unit group of time slots. In the time slot L1, the USB wireless device may send the stereo audio to the earbud L and the earbud R in one packet, and the earbud L and the earbud R pick the corresponding data, respectively; in the time slot L2, the earbud R sends the control data to the earbud L; and in the time slot L3, the earbud L sends the audio or control data to the USB wireless device and sends the control data to the earbud R.

As a result, each of the two earbuds may mix the respective audio from the wireless device and from the mobile terminal for rendering. The earbud L mixes the sound in left channel of the wireless device and the sound in left channel of the mobile terminal for rendering, and the earbud R mixes the sound in right channel of the wireless device and the sound in right channel of the mobile terminal for rendering.

It should be noted that the order of S1 to S8, L1 to L3, and G1 to G2 may be different from that shown in the figure. For example, the L1 to L3 may come first, and then the S1 to S8. For the internal sequence within L1 to L3 and S1 to S8, it is generally kept unchanged, and may be set in conjunction with specific applications. The diagram shown here is a specific example and is not intended to give limitation.

In a second implementation, the method of headset communication may also be implemented by the wearable stereo wireless headset. The earpieces on both sides of the wearable stereo wireless headset are directly connected wiredly.

For the wearable stereo wireless headset, the method of headset communication according to the embodiments of the present disclosure may be performed by firstly generating seventh control data for controlling data transmission of the wireless device based on status information on communication between the stereo wireless headset and the wireless device. Then, the seventh control data is sent to the wireless device through the second wireless communication channel.

Details about the seventh control data may be referred to the aforesaid description, and will not be repeated here.

It should be noted that the communication process of the stereo wireless headset may be understood as a simplified version of the TWS headset communication in practical applications, where the stereo wireless headset may be considered as one earbud to achieve the dual communication with the mobile terminal and the wireless device. The specific data transmission process may be referred to the aforesaid description, and will not be repeated here.

Figure 5:
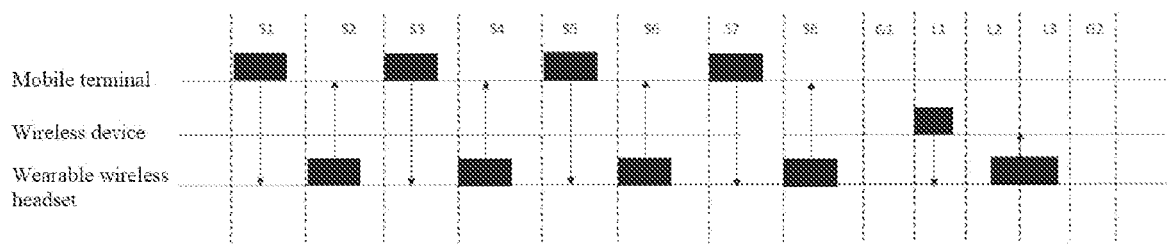
FIG. 5 is a time sequence diagram of communication in a communication method for a wearable wireless headset according to an embodiment of the present disclosure.

To get a further understanding, the headset communication process for the stereo wireless headset will be illustrated in conjunction with the time sequence diagram shown in FIG. 5.

In the time slot configuration shown in FIG. 5, the operations for the time slots is similar to that of the TWS headset, except for the time slots corresponding to L1/L2/L3.

In the unit group of time slots S1/S2, the mobile terminal sends the stereo audio to the headset, and the headset sends the audio (e.g., user audio collected by the microphone) back to the mobile terminal. The unit groups of time slots S3/S4 and S5/S6 are the same as the unit group of time slots S1/S2. In the unit group of time slots S7/S8, the mobile terminal sends control data to the headset, and the headset sends the control data to the mobile terminal In the time slot L1, the USB wireless device sends stereo audio to the headset; and in the time slot L2/L3, the headset sends audio or control data to the USB wireless device.

As a result, the headset may mix the respective audio from the wireless device and from the mobile terminal for rendering.

In the description of this specification, the description with reference to terms such as "some possible embodiment", "some embodiments", "examples", "specific examples", or "some examples", and the like indicates that the specific feature, structure, material or characteristic described in conjunction with the embodiment or example is included in at least one embodiment or example of the present disclosure. In this specification, the schematic representations of the aforesaid terms do not necessarily for the same embodiment or example. Moreover, the specific features, structures, materials or characteristics as described may be combined in any one or more embodiments or examples in a suitable manner. In addition, those skilled in the art may combine and group the different embodiments or examples and the features of the different embodiments or examples described in this specification without contradicting each other.

With respect to the flowchart of the method according to embodiments of the present disclosure, certain operations are depicted as different steps performed in a certain order, and such a flowchart is illustrative rather than restrictive. Some of the steps described herein may be grouped together and performed in a single operation, some steps may be split into a plurality of sub-steps, and some steps may be performed in an order different from that shown herein. All the steps shown in the flowchart may be implemented in any manner by any circuit structure and/or tangible mechanism (e.g., by software running on a computer device, hardware such as logic functions implemented by a processor, chip and the like, and/or any combination thereof).

Figure 6:
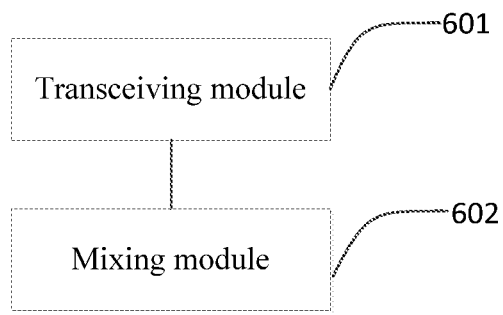
FIG. 6 is a schematic diagram of an apparatus for headset communication according to an embodiment of the present disclosure.

Based on the same technical concept, embodiments of the present disclosure further provide an apparatus for performing the method of headset communication according to any of the aforesaid embodiments. FIG. 6 is a schematic structural diagram of an apparatus for headset communication according to an embodiment of the present disclosure.

As shown in FIG. 6, the apparatus for headset communication according to an embodiment of the present disclosure includes:
 a transceiving module 601 configured to: receive, in response to a call request from a mobile terminal, first audio data sent by the mobile terminal, within a first time slot through a first wireless communication channel pre-established between a wireless headset and the mobile terminal; and receive, in response to an audio transmission request from a wireless device, second audio data sent by the wireless device, within a second time slot through a second wireless communication channel pre-established between the wireless headset and the wireless device, where the first time slot and the second time slot belong to different unit groups of time slots; and
 a mixing module 602 configured to mix the received first and second audio data to acquire mixed audio data for playback.

According to the apparatus for headset communication of the present disclosure, the first audio data sent by the mobile terminal can be received in a first time slot in response to a call request from the mobile terminal, and the second audio data sent by the wireless device can be received in a second time slot in response to a transmission request from the wireless device. In addition, the received first and second audio data can then be mixed to obtain the mixed audio data for playback, where the mixed audio data is a mixture of the first audio data generated by the mobile terminal during the call phase and the second audio data generated by the wireless device during the transmission phase, thus enabling the user to experience another audio during the call. For example, the user can feel the rhythm of the game background audio while making the phone call, which enhances the immersive experience during the headset communication. Furthermore, the first audio data and second audio data are received from different wireless communication channels and in different time slots, which can not only ensure no interference to the signals, but also can minimize the problem of time delay in wireless communication process, thereby being more practical.

According to a possible embodiment, the apparatus is a first earbud of a true wireless stereo (TWS) headset including the first earbud and a second earbud, and further includes:
 a control module configured to receive, in response to a control request from the second earbud, first control data sent by the second earbud, within a third time slot through a third wireless communication channel pre-established between the first earbud and the second earbud. The first control data is configured to control the first earbud to perform an operation corresponding to the first control data, and the second time slot and the third time slot belong to the same unit group of time slots.

According to a possible embodiment, the transceiving module 601 is further configured to:
 perform, after receiving the first audio data, a signal analysis on the first audio data to determine first sub-audio data corresponding to the first earbud; and perform, after receiving the second audio data, a signal analysis on the second audio data to determine second sub-audio data corresponding to the first earbud.

According to a possible embodiment, the mixing module 602 is configured to mix the first and second sub-audio data corresponding to the first earbud to acquire a mixed audio data to be played by the first earbud.

According to a possible embodiment, the control module is further configured to:
receive, in response to a control request from the mobile terminal, second control data sent by the mobile terminal, within a fourth time slot through the first wireless communication channel;
and/or
receive, in response to a control request from the wireless device, third control data sent by the wireless device, within the second time slot through the second wireless communication channel.

According to a possible embodiment, the first wireless communication channel and the second wireless communication channel remain connected simultaneously and the first audio data, the second audio data, the second control data and the third control data are received alternately in respective time slots.

According to a possible embodiment, the first earbud is a primary earbud, and the control module is further configured to:
generate fourth control data for controlling data transmission of the mobile terminal based on status information on communications between the first earbud and the mobile terminal and between the first earbud and the second earbud; and
send the fourth control data to the mobile terminal within a fifth time slot through the first wireless communication channel, where the fourth time slot and the fifth time slot belong to the same unit group of time slots and are adjacent to each other.

According to a possible embodiment, the first earbud is a primary earbud, and the control module is further configured to:
generate fifth control data for controlling data transmission of the wireless device based on status information on communication between the first earbud and the wireless device; and send the fifth control data to the wireless device within a sixth time slot through the second wireless communication channel; and/or
generate, by the first earbud, sixth control data for controlling data transmission of the second earbud based on status information on communications between the first earbud and the wireless device and between the first earbud and the second earbud; and send the sixth control data to the second earbud within the sixth time slot through the third wireless communication channel, where the second time slot and the sixth time slot belong to the same unit group of time slots.

In a possible implementation, the apparatus further includes:
a sending module configured to acquire currently collected user audio data, and send the user audio data to the mobile terminal within a seventh time slot in the frame of the first structure through the first wireless communication channel.

According to a possible embodiment, the control module is further configured to:
send, through the second wireless communication channel, the user audio data and the fifth control data simultaneously to the wireless device within the sixth time slot.

According to a possible embodiment, the wireless headset is a wearable stereo wireless headset, and the control module is further configured to:
generate seventh control data for controlling data transmission of the wireless device based on status information on communication between the stereo wireless headset and the wireless device; and send the seventh control data to the wireless device through the second wireless communication channel.

According to a possible embodiment, a guard time slot is provided between a first unit group of time slots to which the first time slot belongs to and a second unit group of time slots to which the second time slot belongs to.

According to a possible embodiment, at least one first unit group of time slots and at least one second unit group of time slots are provided such that the at least one first unit group of time slots is twice as long as a sum of the guard time slot and the at least one second unit group of time slots.

According to a possible embodiment, a unit group of time slots corresponding to the first wireless communication channel meets time slot requirement for Bluetooth communication; and the at least one first unit group of time slots, the guard time slot and the at least one second unit group of time slots are 7.5 milliseconds long in total.

According to a possible embodiment, the wireless device is connected to an audio source device other than the mobile phone via a universal serial bus (USB) component.

It should be noted that the apparatus according to embodiments of the present disclosure may implement various processes of the method as described above and can achieve the same effect and function, which will not be repeated here.

Figure 7:
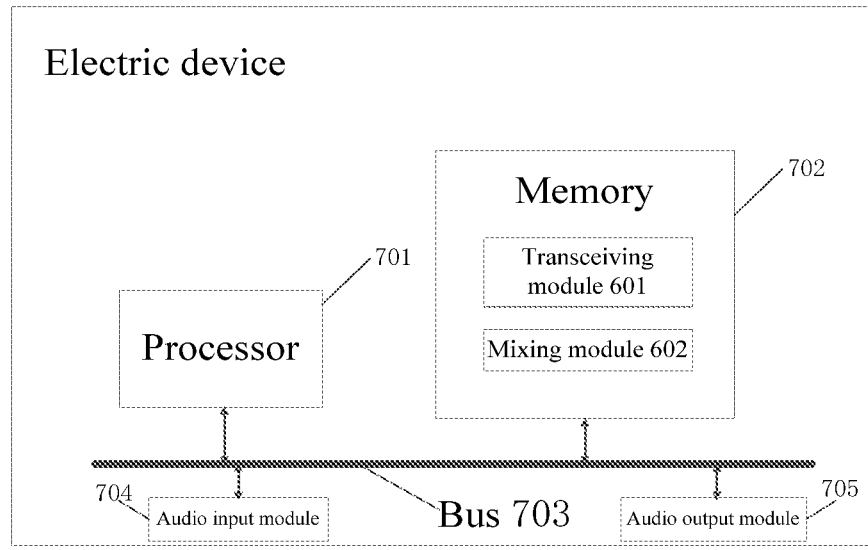
FIG. 7 is a schematic structural diagram of an electric device according to an embodiment of the present disclosure.

Embodiments of the present disclosure further provide an electronic device, and FIG. 7 is a schematic structural diagram of the electronic device according to embodiments of the present disclosure, which includes a processor 701, a memory 702, and a bus 703. The memory 702 has the machine-readable instructions (e.g., execution instructions of the transceiver module 601 and mixing module 602 in the apparatus shown in FIG. 6) executable by the processor 701 stored therein. When the electronic device is in operation, the processor 701 communicates with the memory 702 via the bus 703, and the machine-readable instructions, when executed by the processor 701, execute the following instructions:
receiving, in response to a call request from a mobile terminal, first audio data sent by the mobile terminal, within a first time slot through a first wireless communication channel pre-established between a wireless headset and the mobile terminal;
receiving, in response to an audio transmission request from a wireless device, second audio data sent by the wireless device, within a second time slot through a second wireless communication channel pre-established between the wireless headset and the wireless device, where the first time slot and the second time slot belong to different unit groups of time slots; and
mixing the received first and second audio data to acquire mixed audio data for playback.

As shown in FIG. 7, there may also be an audio input module 704 and an audio output module 705 in practical applications. The audio input module 704 may be a device with audio input function such as a microphone, and the audio output module 705 may be a device with audio playback function such as a speaker, which will not be specifically limited here.

According to some embodiments of the present disclosure, a non-volatile computer storage medium for the method of headset communication is provided. The non-volatile computer storage medium has computer-executable instructions stored thereon, and the computer-executable instructions, when executed by the processor, are configured to execute the method according to the aforesaid embodiments.

The respective embodiments of the present disclosure are described in a progressive manner. The reference may be made to each other for the same or similar parts of the respective embodiments, and each embodiment focuses on the differences from other embodiments. Especially, for the embodiments of the apparatus, device and computer-readable storage medium, since they basically correspond to the embodiments of the method, they are described in a simple way, and reference may be made to the description part on embodiments of the method for relevant points.

The apparatus, device and computer-readable storage medium according to embodiments of the present disclosure correspond to the method one by one. Thus, the apparatus, device and computer-readable medium have similar beneficial technical effects with the corresponding method. Since the beneficial technical effects of the method have been described in detail above, the beneficial technical effects of the apparatus, device and computer-readable storage medium will not be repeated here.

One skilled in the art should understand that, the embodiments of the present disclosure may be provided as a method, apparatus (device or system) and computer-readable storage medium. Therefore, the present disclosure may be in the form of full hardware embodiments, full software embodiments, or a combination thereof. Moreover, the present disclosure may be in the form of a computer-readable storage medium that is implemented on one or more computer-usable storage media (including, without limitation, magnetic disk storage, CD-ROM and optical storage) containing computer-usable program codes.

The present disclosure is described referring to the flowchart and/or block diagram of the method, apparatus (device or system) and computer-readable storage medium according to the embodiments of the present disclosure. It should be understood that, each flow and/or block in the flowchart and/or block diagram and the combination of flow and/or block in the flowchart and/or block diagram may be realized via computer program instructions. Such computer program instructions may be provided to the processor of a general-purpose computer, special-purpose computer, a built-in processor or other programmable data processing devices to produce a machine, such that the instructions executed by the processor of a computer or other programmable data processing devices may produce a device for realizing the functions specified in one or more flows in the flowchart and/or one or more blocks in the block diagram.

Such computer program instructions may also be stored in a computer-readable storage that can guide a computer or other programmable data processing devices to work in a specific mode, such that the instructions stored in the computer-readable storage may produce a manufacture including a commander device, where the commander device may realize the functions specified in one or more flows of the flowchart and one or more blocks in the block diagram.

Such computer program instructions may also be loaded to a computer or other programmable data processing devices, such that a series of operational processes may be executed on the computer or other programmable devices to produce a computer-realized processing, and thereby the instructions executed on the computer or other programmable devices may provide a process for realizing the functions specified in one or more flows in the flowchart and/or one or more blocks in the block diagram.

In a typical configuration, the computing device includes one or more processors (CPU), an input/output interface, a network interface, and a memory.

The memory may include a non-permanent memory in a computer-readable medium, a random access memory (RAM) and/or a non-volatile memory, such as a read-only memory (ROM) or a flash memory (flash RAM). The memory is an example of a computer-readable medium.

The computer-readable medium may be permanent and non-permanent, or removable and non-removable media, which can achieve the information storage by any method or technology. The information may be computer-readable instructions, data structures, program modules, or other data. Examples of the computer storage medium include, but are not limited to, a phase change memory (PRAM), a static random access memory (SRAM), a dynamic random access memory (DRAM), other types of random access memory (RAM), read-only memory (ROM), an electrically erasable programmable read-only memory (EEPROM), a flash memory or other memory technologies, a CD-ROM, a digital versatile disc (DVD) or other optical storage, and a magnetic cassette tape. The magnetic tape storage or other magnetic storage devices or any other non-transmission medium may be used to store information that can be accessed by computing devices. Furthermore, although the operations of the method of the present disclosure are described in a specific order in drawings, it does not require or imply that the operations must be performed in the specific order, or that the desired result can only be achieved if all the operations as shown are performed. Additionally or alternatively, some steps may be omitted, multiple steps may be combined into one step for execution, and/or one step may be decomposed into multiple steps for execution.

Although the spirit and principles of the present disclosure have been described with reference to several embodiments, it shall be understood that the present disclosure is not limited to the embodiments as disclosed, nor does the division of the aspects imply that the features in those aspects cannot be combined for benefit, such division being for convenience of presentation only. The present disclosure is intended to cover various modifications and equivalent arrangements included within the spirit and scope of the appended claims.

What is claimed is:

1. A method of headset communication, comprising:
receiving, by a wireless headset in response to a call request from a mobile terminal, first audio data sent by the mobile terminal, within a first time slot through a first wireless communication channel pre-established between the wireless headset and the mobile terminal;
receiving, by the wireless headset in response to an audio transmission request from a wireless device, second audio data sent by the wireless device, within a second time slot through a second wireless communication channel pre-established between the wireless headset and the wireless device, wherein the first time slot and the second time slot belong to different unit groups of time slots; and
mixing, by the wireless headset, the received first and second audio data to acquire mixed audio data for playback,
wherein the wireless headset is a true wireless stereo (TWS) headset comprising a first earbud and a second earbud, and the method further comprises:
receiving, by the first earbud in response to a control request from the second earbud, first control data sent by the second earbud, within a third time slot through a third wireless communication channel pre-established between the first earbud and the second earbud, wherein the first control data is configured to control the first earbud to perform an operation corresponding to the first control data, and the second time slot and the third time slot belong to the same unit group of time slots.

2. The method according to claim 1, further comprising:
performing, by the first earbud after receiving the first audio data, a signal analysis on the first audio data to determine first sub-audio data corresponding to the first earbud; and
performing, by the first earbud after receiving the second audio data, a signal analysis on the second audio data to determine second sub-audio data corresponding to the first earbud.

3. The method according to claim 2, wherein mixing, by the wireless headset, the received first and second audio data to acquire the mixed audio data for playback comprises:
mixing, by the first earbud, the first and second sub-audio data corresponding to the first earbud to acquire a mixed audio data to be played by the first earbud.

4. The method according to claim 1, further comprising:
performing, by the second earbud after receiving the first audio data, a signal analysis on the first audio data to determine first sub-audio data corresponding to the second earbud; and
performing, by the second earbud after receiving the second audio data, a signal analysis on the second audio data to determine second sub-audio data corresponding to the second earbud.

5. The method according to claim 1, further comprising:
receiving, by the TWS headset in response to a control request from the mobile terminal, second control data sent by the mobile terminal, within a fourth time slot through the first wireless communication channel; and/or
receiving, by the TWS headset in response to a control request from the wireless device, third control data sent by the wireless device, within the second time slot through the second wireless communication channel.

6. The method according to claim 5, wherein the first wireless communication channel and the second wireless communication channel remain connected simultaneously and the first audio data, the second audio data, the second control data and the third control data are received alternately in respective time slots.

7. The method according to claim 5, wherein the first earbud is a primary earbud, and the method further comprises:
generating, by the first earbud, fourth control data for controlling data transmission of the mobile terminal based on status information on communications between the first earbud and the mobile terminal and between the first earbud and the second earbud; and
sending, by the first earbud, the fourth control data to the mobile terminal within a fifth time slot through the first wireless communication channel, wherein the fourth time slot and the fifth time slot belong to the same unit group of time slots and are adjacent to each other.

8. The method according to claim 1, wherein the first earbud is a primary earbud, and the method further comprises:
generating, by the first earbud, fifth control data for controlling data transmission of the wireless device based on status information on communication between the first earbud and the wireless device; and sending, by the first earbud, the fifth control data to the wireless device within a sixth time slot through the second wireless communication channel; and/or
generating, by the first earbud, sixth control data for controlling data transmission of the second earbud based on status information on communications between the first earbud and the wireless device and between the first earbud and the second earbud; and
sending, by the first earbud, the sixth control data to the second earbud within a sixth time slot through the third wireless communication channel,
wherein the second time slot and the sixth time slot belong to the same unit group of time slots.

9. The method according to claim 8, further comprising:
acquiring, by the first earbud, currently collected user audio data; and
sending, by the first earbud, the user audio data to the mobile terminal within a seventh time slot through the first wireless communication channel, wherein the first time slot and the seventh time slot belong to the same unit group of time slots and are adjacent to each other.

10. The method according to claim 9, wherein sending, by the first earbud, the fifth control data to the wireless device within the sixth time slot comprises:
sending, by the first earbud through the second wireless communication channel, the user audio data and the fifth control data simultaneously to the wireless device within the sixth time slot.

11. The method according to claim 1, wherein the wireless headset is a stereo wireless headset, and the method further comprises:
generating, by the stereo wireless headset, seventh control data for controlling data transmission of the wireless device based on status information on communication between the stereo wireless headset and the wireless device; and
sending, by the stereo wireless headset, the seventh control data to the wireless device through the second wireless communication channel.

12. The method according to claim 1, wherein a guard time slot is provided between a first unit group of time slots to which the first time slot belongs to and a second unit group of time slots to which the second time slot belongs to.

13. The method according to claim 12, wherein at least one first unit group of time slots and at least one second unit group of time slots are provided such that the at least one first unit group of time slots is twice as long as a sum of the guard time slot and the at least one second unit group of time slots.

14. The method according to claim 13, wherein a unit group of time slots corresponding to the first wireless communication channel meets time slot requirement for Bluetooth communication; and the at least one first unit group of time slots, the guard time slot and the at least one second unit group of time slots are 7.5 milliseconds long in total.

15. The method according to claim 1, wherein the wireless device is connected to an audio source device other than the mobile phone via a universal serial bus (USB) component.

16. An apparatus for headset communication, comprising:
a transceiving module configured to: receive, in response to a call request from a mobile terminal, first audio data sent by the mobile terminal, within a first time slot through a first wireless communication channel pre-established between a wireless headset and the mobile terminal; and receive, in response to an audio transmission request from a wireless device, second audio data sent by the wireless device, within a second time slot through a second wireless communication channel pre-established between the wireless headset and the wireless device, wherein the first time slot and the second time slot belong to different unit groups of time slots; and a mixing module configured to mix the received first and second audio data to acquire mixed audio data for playback, wherein the apparatus is a first earbud of a true wireless stereo (TWS) headset including the first earbud and a second earbud, and further comprises a control module configured to receive, in response to a control request from the second earbud, first control data sent by the second earbud, within a third time slot through a third wireless communication channel pre-established between the first earbud and the second earbud, wherein the first control data is configured to control the first earbud to perform an operation corresponding to the first control data, and the second time slot and the third time slot belong to the same unit group of time slots.

17. The apparatus according to claim 16, wherein a guard time slot is provided between a first unit group of time slots to which the first time slot belongs to and a second unit group of time slots to which the second time slot belongs to.

18. A non-transitory computer-readable storage medium comprising computer program instructions stored thereon, wherein the computer program instructions, when executed by a multicore processor, cause the multicore processor to implement a method of headset communication according to claim 1.

* * * * *